US00RE35461E

United States Patent [19]

Marsh et al.

[11] E Patent Number: Re. 35,461

[45] Reissued Date of Patent: Feb. 25, 1997

[54] LUBRICATING OIL ADDITIVES

[75] Inventors: John F. Marsh; Joseph M. Swietlik, both of Abingdon, United Kingdom

[73] Assignee: Exxon Research and Engineering Company, Linden, N.J.

[21] Appl. No.: 162,551

[22] Filed: Dec. 2, 1993

Related U.S. Patent Documents

Reissue of:

[64] Patent No.: 5,069,804
Issued: Dec. 3, 1991
Appl. No.: 232,952
Filed: Aug. 17, 1988

U.S. Applications:

[63] Continuation of Ser. No. 896,572, Aug. 18, 1986, abandoned, which is a continuation of Ser. No. 492,474, May 6, 1983, abandoned.

[30] Foreign Application Priority Data

May 14, 1982 [GB] United Kingdom ..... 8214192

[51] Int. Cl.[6] ..... C10M 159/22

[52] U.S. Cl. ..... 508/322

[58] Field of Search ..... 252/33.3, 33.4, 252/39, 42.7, 56 R

[56] References Cited

U.S. PATENT DOCUMENTS

| | | | |
|---|---|---|---|
| 3,336,224 | 8/1967 | Allphin | 252/33.4 |
| 3,372,116 | 3/1968 | Meinhardt | 252/36 |
| 3,388,063 | 6/1968 | Allphin | 252/33.4 |
| 3,410,798 | 11/1968 | Cohen | 252/37.2 |
| 3,966,621 | 6/1976 | Watkins et al. | 252/42.7 |
| 4,049,560 | 9/1977 | Dominey | 252/42.7 |
| 4,104,180 | 8/1978 | Burnop | 252/33 |
| 4,171,269 | 10/1979 | Sung et al. | 252/33 |
| 4,221,673 | 9/1980 | Robson et al. | 252/42.7 |
| 4,295,981 | 10/1981 | Burnop | 252/33 |
| 4,328,111 | 5/1982 | Watson et al. | 252/42.7 |

FOREIGN PATENT DOCUMENTS

| | | | |
|---|---|---|---|
| 1353034 | 5/1974 | United Kingdom | C10M 1/20 |
| 1440261 | 6/1976 | United Kingdom . | |

OTHER PUBLICATIONS

European Patent Application No. 94,814 as published on Nov. 23, 1983.

*Primary Examiner*—Jacqueline V. Howard

[57] ABSTRACT

Improved stability of overbased phenates, particularly when formulated with overbased sulphonates, as well as improved foaming tendency and viscosity is obtained by treated the overbased phenate, either during or subsequent to the overbasing process, with from 0.1 to 10 wt. %, preferably 2 to 6 wt. %, of a carboxylic acid with a $C_{10}$ to $C_{24}$ unbranched segment, e.g. behenic acid.

28 Claims, No Drawings

LUBRICATING OIL ADDITIVES

Matter enclosed in heavy brackets [ ] appears in the original patent but forms no part of this reissue specification; matter printed in italics indicates the additions made by reissue.

This is a continuation, of application Ser. No. 896,572, filed Aug. 18, 1986, which is a Continuation of application Ser. No. 492,474, filed May 6, 1983, both now abandoned.

This invention relates to lubricating oil additives which have high basicity, commonly known as overbased additives, and concentrates and lubricating oils containing them.

Many additive concentrates for lubricating oil compositions containing overbased additives suffer from lack of stability giving rise to sedimentation. Also such additives have a tendency to give foaming problems either during their manufacture, during formulation of lubricating oils containing them or during their use as lubricants. We have now found that the addition of certain carboxylic acids either during preparation of the overbased additive or to the formed overbased additive results in reduced tendency to sedimentation, reduced foaming and also may result in a valuable reduction in viscosity of oil solutions of the additive.

Some attempts have been made in the past to improve stability of lubricating oil compositions containing overbased detergent additives. U.S. Pat. No. 3714042 describes the addition of a high molecular weight aliphatic carboxylic acid or anhydride having at least 25 aliphatic carbon atoms per carboxy group to a basic Group I or II metal, specifically calcium or magnesium sulphonate, sulphonate-carboxylate or carboxylate complex to reduce tendency to foam and haze. The preferred acids are polyisobutenyl succinic acids having a molecular weight of 700 to 5000. U.S. Pat. No. 3793201 discloses similar high molecular weight acids (with at least 30 carbon atoms) as solubility improvers in combination with metal salts, such as alkaline earth metal salts of bridged phenols for oil-soluble basic magnesium salts of sulphonic and/or carboxylic acids. GB 1471934 discloses lubricating oil compositions containing an overbased detergent additive to which is added to improve foam stability a) a mono- or dicarboxylic acid or derivative having at least 30 carbon atoms or a reaction product of a phosphorus sulphide with a hydrocarbon and b) a dihydric alcohol or glycol having 2 to 4 carbon atoms, a di- or tri-($C_2$–$C_4$) glycol or an ether alcohol having 2 to 10 carbon atoms: the combination of a polyisobutylene succinic acid and glycol is preferred. Under severe conditions none of these prior art treatments have been found totally satisfactory.

Other treatments of overbased additives with acids have been described. U.S. Pat. No. 3410801 describes the treatment of overbased metal sulphonates, particularly alkaline earth metal sulphonates, with from 10 to 150 weight % of a $C_{12}$ to $C_{22}$ fatty acid to give a friction modifier additive for a lubricating oil. U.S. Pat. No. 3242079 discloses grease compositions comprising an overbased alkaline earth metal sulphonate and from 1 to 80 weight % of an active hydrogen compound such as a lower aliphatic carboxylic acid defined as having less than 8 carbon atoms. U.S. Pat. No. 4328111 describes the addition of acidic compounds including organic carboxylic acids to over-based metal sulphonates, phenates or mixtures thereof to improve the properties of the overbased material in lubricating oil compositions and to improve solvent separation from the overbased material. The organic carboxylic acids may be straight or branched, saturated, unsaturated or aromatic and optionally substituted. A ratio of basic compound to acidic compound of 1.5 to 50:1, preferably 2 to 20:1 is disclosed.

Acids have also been incorporated into the reaction mixture from which overbased detergent additives are prepared. GB 1297150 described the formation of basic magnesium salts of organic acids in which the reaction mixture comprises certain proportions of an organic acid for overbasing, such as an aromatic carboxylic or sulphonic acid, and a separate aliphatic carboxylic acid or sulphonic acid capable of overbasing. U.S. Pat. No. 3671430 describes the preparation of a high alkalinity oil-soluble alkaline earth metal hydrocarbon sulphonate using an alkaline earth metal sulphonate as the dispersant and a second dispersant which may be inter alia a long chain hydrocarbon monocarboxylic acid, dicarboxylic acid or anhydride with from 20 to 200 carbon atoms in the chain. U.S. Pat. No. 4164472 also describes the use of a saturated or unsaturated fatty acid as a dispersant in preparing a calcium-containing dispersion in a non-volatile liquid. GB 1469289 describes the use of at least 0.1 weight % of a C1 to C18 carboxylic acid or derivative thereof as a promoter in the formation of an overbased magnesium detergent.

We have found that certain carboxylic acids having a long, straight unbranched hydrocarbyl segment have a surprising effect in improving the properties of lubricating oil compositions containing overbased detergent additives when employed in relatively small amounts.

The present invention therefore provides an additive concentrate for incorporation in a lubricating oil composition comprising lubricating oil, and from 10 to 90 wt% of an overbased alkaline earth metal hydrocarbyl sulphurized phenate which has been treated, either during or subsequent to the overbasing process, with from 0.1 to 10 wt % (based on the weight of the additive concentrate) of an acid of the formula:

$$\underset{R'}{R-CH}-COOH \qquad (I)$$

(wherein R is a $C_{10}$ to $C_{24}$ unbranched alkyl or alkenyl group, and R' is hydrogen, a $C_1$ to $C_4$ alkyl group or a $-CH_2-COOH$ group) or an anhydride or a salt thereof.

The concentrate will typically contain from 10 to 90 wt %, preferably from 30 to 90 wt %, of the overbased phenate, and usually comprises at least 50 wt % of active materials in solution in the lubricating oil.

The lubricating oil can be any animal, vegetable or mineral oil, for example ranging from petroleum oil to SAE 30, 40 or 50 lubricating oil grades, castor oil, fish oils or oxidised mineral oil.

Alternatively the lubricating oil can be a synthetic ester lubricating oil and these include diesters such as di-octyl adipate, di-octyl sebacate, didecyl azelate, tridecyl adipate, didecyl succinate, didecyl glutarate and mixtures thereof. Alternatively the synthetic ester can be a polyester such as that prepared by reacting polyhydric alcohols such as trimethylol propane and pentaerythritol with monocarboxylic acids such as butyric acid to give the corresponding tri- and tetra-esters. Also complex esters may be used, such as those formed by esterification reactions between a carboxylic acid, a glycol and an alcohol or a mono-carboxylic acid.

Overbased alkaline earth metal sulphurized hydrocarbyl phenates or "overbased phenates" are high alkalinity alkaline earth sulphurised hydrocarbyl phenates which contain metal base in excess of that required for neutralisation of the sulphurised hydrocarbyl phenol. The overbased phenates where the hydrocarbyl group(s) are alkyl group(s) are preferred, and the preparation of overbased phenates will be described in relation to these preferred phenates.

The starting alkyl phenol may contain one or more alkyl substituents. These may be branched or unbranched, and depending on the number of substituents be $C_1$ to $C_{30}$, preferably $C_9$ to $C_{18}$ groups. Mixtures of alkyl phenols with different alkyl substituents may be used.

The alkyl phenol may be sulphurized as a separate step before the overbasing stage described hereinafter. This sulphurization may be accomplished by reacting the alkyl phenol with sulphur chloride or by reaction with sulphur in the presence of a base. Alternatively, the reaction with sulphur may be carried out as part of the overall overbasing process. In addition to the desired sulphurised alkyl phenol of the general formula:

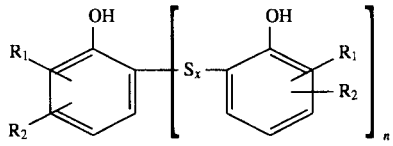

(where x is an integer from 1 to 3, n is an integer from 1 to 3, $R_1$ is a $C_1$–$C_{30}$ alkyl group, for example a $C_9$–$C_{18}$ alkyl group and $R_2$ is hydrogen or said alkyl group), the product may contain a minor amount (typically 10 wt. % or less of the sulphurized alkyl phenol) of a number of byproducts resulting from side reactions, e.g. chlorination of the aromatic ring when using sulphur chloride, or formation of organo sulphur groups resulting from reaction of sulphur with overbasing reaction solvents.

The sulphurised alkyl phenol is reacted with excess alkaline earth metal base in the presence of a dihydroxyl solvent which is usually ethylene glycol although other glycols may be used. An additional monohydroxyl solvent (e.g. isodecanol) may also be used. The alkaline earth metal base may be an oxide or a hydroxide. Carbon dioxide is then introduced to convert the excess metal base into metal carbonate. Volatile reaction products and solvents are then removed by distillation filtration or centrifugation. Alternatively, as indicated above, sulphur and alkyl metal may be charged prior to carbonation to form the sulphurised phenol in situ, which is then reacted with base and carbonated as described. As an alternative a metal alkoxide may be used as the starting metal base and the inclusion of water is then required to hydrolyse the alkoxides. For this modification, glycol esters are suitable solvents. A carbonated metal alkoxide can also be used.

Highly preferred overbased phenates are the overbased calcium phenates and overbased magnesium phenates. A preferred process for preparation of overbased calcium phenate is described in GB 1 470 338. A preferred process for preparation of overbased magnesium phenate is described in GB 1 469 289.

The acid of general formula I may be a mono- or dicarboxylic acid provided that it has a long, unbranched alkyl or alkenyl segment. When R is an alkenyl group it preferably contains only one double bond, and alkyl groups are most preferred.

A preferred group of acids of general formula I are those wherein R is a $C_{10}$ to $C_{24}$ straight chain alkyl group and R' is hydrogen. A particularly preferred group of acids of general formula I are unbranched, saturated fatty acids having from 12 to 24 carbon atoms, most preferably from 18 to 24 carbon atoms. Examples include lauric, myristic, palmitic, stearic, eiconsanoic and behenic acid. The fatty acids need not be pure, and commercial grades containing a range of fatty acids, including some unsaturated components, are acceptable. Mixed fatty acids such as those derived from linseed oil, soybean oil and tall oil may also be used.

An example of a preferred unsaturated acid, especially for use in treating the overbased phenate subsequent to the overbasing process, is oleic acid.

Synthetic mono- and dicarboxylic acids may be used, and these may be prepared by functionalising an appropriate straight chain α-olefin, for example by reaction with an appropriate anhydride. Dicarboxylic acids may be obtained by reaction of the α-olefin with maleic anhydride.

Anhydrides and salts of these acids may be employed. The choice of a salt for use in the invention should be chosen having regard to the other components of the additive and the point at which it is to be added. Generally metal salts corresponding to the metal in the overbased sulphurized phenate are preferred, provided that they are compatible with the other components under the conditions at which they are introduced.

The acid or derivative is employed in an amount of from 0.1 to 10 weight % based on the weight of the additive concentrate, and preferably from 2 to 6 weight % acid or derivative thereof is employed.

As an example stearic acid may be added to the reaction mixture for preparing an overbased calcium sulphurized phenate prior to carbonation in an amount of 2 to 6 weight % stearic acid, based on the weight of the resultant additive concentrate containing the overbased product. This has been found to give improved foam and sediment performance together with an improvement in viscosity.

The acid may be used in addition to other compounds conventionally employed to enhance the properties of overbased detergent additives. In particular, it may be used in conjunction with the treatment of the overbased additive with the high molecular weight acid and glycol combination described in GB 1 471 934.

It has been found most surprisingly that particularly good results are obtained by using the acid treatment of the invention in conjunction with the addition to the overbased phenate of certain glycols and ether derivatives thereof.

The invention extends to a process for preparing an additive concentrate comprising adding to a lubricating oil an overbased alkaline earth metal sulphurized phenate and at least 0.1 weight % (based on the weight of the total additive concentrate) of an acid of general formula I, or an anhydride or salt thereof. The acid of general formula I or its derivative is preferably introduced at a temperature of from 20° to 210° C., more preferably from 80° to 150° C. The temperature is chosen to ensure adequate fluidity and to enable ready mixing with the other components of the additive concentrate. Alternatively, the invention provides a process in which an acid of general formula I or an anhydride or salt thereof is introduced into a reaction mixture for preparing an overbased alkaline earth metal sulphurized phenate and containing a lubricating oil to form the desired concentrates of the invention. In this alternative process the acid may be added to the overbasing reaction mixture in addition to conventional additives to that overbasing process such as organic sulphonic acids, sulphonates or sulphates and reaction promoters such as $C_1$ to $C_4$ acids or their derivatives e.g. salts of formic acid.

In a preferred aspect there is added to the additive concentrate of the invention at least 0.1 wt % (based on the weight of the additive concentrate) of a polyhydric alcohol having from 2 to 4 carbon atoms, a di- or tri- ($C_2$–$C_4$) glycol or an ether alcohol having from 2 to 10 carbon atoms. The polyhydric alcohol may, for example, be a dihydric alcohol such as ethylene glycol or propylene glycol or a trihydric alcohol such as glycerol. Examples of di- and triglycols include diethylene glycol and triethylene glycol. Examples of ether alcohols include the alkyl ethers of the previously mentioned glycols. The preferred glycol is ethylene glycol.

It has been found advantageous to add from 0.1 to 10 wt % (based on the weight of the additive concentrate) of the glycol or ether derivative thereof and from 0.5 to 6 wt % is preferred. The glycol or ether derivative thereof is added to the additive concentrate subsequent to the overbasing process. As indicated hereinbefore it is usual to employ a solvent such as ethylene glycol in the overbasing process and this is then removed, most usually by distillation or stripping. The glycol or ether derivative thereof may be added to the additive concentrate subsequent to the step of removing any solvent and volatile material. When the acid of general formula I or its derivative is also added to the overbased phenate subsequent to the overbasing process the acid and glycol may be added separately in either order or together. In a preferred aspect of the alternative process when the acid is added to the overbasing reaction mixture, the glycol or ether derivative thereof is added to the additive concentrate subsequent to the overbasing reaction.

The additive concentrates of the invention may also be combined with other lubricating oil additives and concentrates to form a lubricating oil additive package or a complete lubricating oil, e.g. with dispersants, viscosity index improvers, anti-oxidants, anti-wear additives and lubricity improvers.

Such additive packages will typically contain from 10 to 90 wt. % of active materials, and generally contain at least 50 wt. % of active material. The amount of overbased sulphurized phenate treated with acid according to the invention which is incorporated within such packages may vary within very wide limits depending on the end-use for which the package is intended and the amount of other additives.

The invention extends to lubricating oil compositions comprising lubricating oil and from 0.01 to 30 wt. % (based on the total composition) of an additive concentrate of the invention comprising from 10 to 90 wt % of the overbased alkaline earth metal hydrocarbyl sulphurized phenate optionally with other additives as described hereinbefore. Preferably lubricating oil compositions contain from 0.5 to 20 wt. % of the additive concentrate.

The invention will now be further described, though only by way of illustration, with reference to the following Examples.

In the following Examples, the performance of additive concentrates of the invention is evaluated in terms of their foaming tendency, viscosity and stability with other additives, and their performance is compared with that of a conventional overbased additive concentrate, alone and with conventional supplements to improve foam and stability performance. In the first series of Examples the conventional overbased additive concentrate is an oil solution of an overbased calcium sulphurized alkyl phenate prepared from dodecyl phenol containing 3.63%S and 10.4%Ca with 272 TBN (Total Base Number—ASTM D664), and approximately 27 weight % oil—it is referred to hereinafter as "additive concentrate X".

Foam tendency

The foaming tendency of the additive concentrate is measured according to standard method ASTM D892-74 (IP 146/73) in which a 2 wt % solution of the sample under test in a base oil is blown with air at a constant rate for five minutes and allowed to settle for ten minutes, with the foam volume being measured in ml at the end of both periods. The results are given as two numbers, the first representing the foam volume after ten minutes settling. This test is also carried out with the addition of 400 ppm of a conventional silicone anti-foaming additive.

Kinematic Viscosity

Viscosity of the additive concentrate is measured at 100° C. using standard method ASTM D445-79 (IP71/79). The results are given in cSt. ($1 m^2/s=10^4 St$).

Stability

Stability is measured by blending 19.8 weight % of the additive concentrate under test with 80.2 weight % of a heavy paraffinic base oil containing an overbased calcium salt of a branched chain $C_{24}$ sulphonic acid with 300 TBN and other overbased detergent additives such that the blend has an overall TBN of 70. The blend is made at 70° C., then poured into a 100 ml centrifuge tube and stored at room temperature (approximately 20° C.). Volume % sediment is observed at initial formulation and after three weeks. This blend, containing both overbased phenate and overbased sulphonates has been found to present particular problems of compatibility, and thus to be an extremely severe test of the additive concentrates of the invention.

Examples 1–7: Post-treatment of overbased calcium phenates

Samples of the additive concentrate X are mixed with various fatty acids at 110° C. to form additive concentrates of the invention, which are tested as described above. To provide a comparison, tests were also carried out on additive concentrate X alone, and with the addition of PIBSA (polyisobutylene succinic acid, M.W. approx. 900) and ethylene glycol. The results are given in Table 1, and show that the compositions of the invention give improved stability and foam performance, with reduced viscosity as compared to the untreated comparison and the comparison samples treated with PIBSA alone and ethylene glycol alone. The compositions also appear to be more readily controlled by the addition of conventional silicone anti-foam additives. The comparison sample treated with a PIBSA/ethylene glycol combination show good foaming performance when treated with a silicone additive but has a higher viscosity than most of the compositions of the invention and showed poorer stability after 3 weeks.

TABLE 1

| Example | Treatment | wt. % | Foam tendency (ml/ml) | with 400 ppm silicone | Viscosity (cSt) | Stability (% sediment) Initial | 3 weeks |
|---|---|---|---|---|---|---|---|
| Comparison | None | — | 510/460 | 370/360 | 622 | hazy | n.m.* |
| " | PIBSA | 2.5 | 430/390 | 580/260 | 915 | hazy | n.m. |
| " | ethylene glycol | 2.5 | 640/570 | 480/230 | n.m. | hazy | n.m. |
| " | PIBSA + ethylene glycol | 2.0 + 2.0 | 600/530 | 0/0 | 424 | clear | 6 |
| 1 | stearic acid | 5.0 | 70/40 | 0/0 | 244 | clear | 1 |
| 2 | behenic acid | 5.0 | 220/30 | 0/0 | 290 | clear | 0 |
| 3 | Prifac 2989[1] | 5.0 | 430/80 | 0/0 | 339 | clear | 0 |
| 4 | behenic acid[2] | 5.0 | 410/60 | 0/0 | 267 | clear | 0 |
| 5 | oleic acid | 5.0 | 380/350 | 0/0 | 250 | clear | 2 |
| 6 | behenic acid + ethylene glycol | 3.0 + 3.0 | 470/180 | 0/0 | 436 | clear | 0 |
| 7 | behenic acid + sulphonic acid[3] | 2.0 + 5.0 | 770/690 | 350/210 | 278 | clear | 0 |

Notes.
*n.m. = not marked
[1]Product of Unichemna International - 87% behenic acid, iodine value 2.0
[2]Product of Henkel & Cie GmbH - 80% behenic acid
[3]Alkyl benzene sulphonic acid - 80% $C_{24}$—20% $C_{18}$

Example 8: Preparation of overbased calcium sulphurized phenate using behenic acid An additive concentrate of the invention was prepared by adding behenic acid prior to carbonation in the synthesis of additive concentrate X. A reaction mixture was prepared from:

230 g (0.88 moles) dodecylphenol
40 g (0.12 moles) behenic acid
63 g (1.97 moles) sulphur
135 g (0.85 moles) isodecanol
95 g (1.70 moles) calcium oxide and stirred at 70° C. A mixture of 162 g (2.61 moles) ethylene glycol and 6.7 g (0.37 moles) water was added dropwise over 30 minutes. The temperature was increased to 110° C. 108 g of a lubricating oil were added and carbonation was commenced by introducing 50 ml/min. carbon dioxide. The temperature was increased to 150° C. over 1 hour, then further increased to 160° C. over 40 minutes, and to 170° C. over a further 20 minutes. Carbonation was continued for about 6 hours until the end point was reached. Then carbonation was stopped and the temperature raised to 210° C., finally stripping at 60 mm Hg absolute pressure to remove solvent. The vacuum was released, 67 g of base oil were added and the whole cooled to 170° C. After filtration a composition containing an overbased calcium sulphurized phenate and approximately 6 weight % (based on the weight of the concentrate) behenic acid was obtained. TBN was 244, calcium content 10.1 weight % and sulphur content 3.85 weight %. This was tested as described above and the following results obtained:

| | |
|---|---|
| Kinematic Viscosity (100° C.) | 399 cSt |
| Foam (ml) | 0/0 |
| Stability after 3 weeks | clear (0% sediment) |

To provide a comparison a similar overbased calcium sulphurized phenate was prepared without behenic acid from the following reaction mixture:

| | |
|---|---|
| 270 g | dodecylphenol |
| 63 g | sulphur |
| 135 g | isodecanol |
| 95 g | calcium oxide |

using the procedure described above. The product had a TBN of 262 and contained 10.15 wt. % calcium and 3.84 wt. % sulphur. This was tested as described above and the following results obtained:

| | |
|---|---|
| Kinematic Viscosity (100° C.) | 956 cSt |
| Foam (ml) | 560/500 |
| Stability | Initially hazy |

This clearly shows the advantage of the additive concentrate of the invention over a prior art concentrate prepared without the use of behenic acid. The concentrate of the invention gave excellent results with perfect results in the foam test as compared to a considerable foaming tendency found when behenic acid was not used. The concentrate of the invention was initially clear and remained a clear solution after 3 weeks in the stability test. The decreased viscosity of the concentrate of the invention is also an important credit.

Examples 9–21: Preparation of overbased calcium sulphurized phenate in the presence of acid The procedure of Example 8 was repeated using different amounts of various acids, and in some cases with the addition of ethylene glycol subsequent to overbasing. The foam performance and stability of the products was tested as described hereinbefore, with the exceptions that a) the foam test was carried out on a 1.8 wt % solution of the sample in a lubricating oil formulated without an overbased phenate but containing the remainder of the additives chosen for the finished oil and b) the stability test was carried out over 4 weeks at 20° C. and 60° C. To provide a comparison the same testing was carried out on additive concentrate X alone and on additive concentrate X to which had been added 2.0 wt % PIBSA (M.W.=900) and 2.0 wt % ethylene glycol. The results are given in Table 2, and show the significant improvement in foam and stability performance for the additive of the invention against the untreated additive X and additive X post-treated with PIBSA/glycol. Moreover, the improvement is achieved with a valuable decrease in viscosity whereas the PIBSA/glycol treatment results in a viscosity increase.

TABLE 2

| Example | Treatment | (wt %) | TBN | Foam Tendency (ml/ml) | | Viscosity (cSt) | Stability (%) | |
|---|---|---|---|---|---|---|---|---|
| | | | | | +400 ppm silicone | | 4 weeks at 20° C. | 4 weeks at 60° C. |
| Comparison | None | — | 254 | 620/560 | 480/380 | 417 | 15 | 3 |
| | PIBSA + ethylene glycol | 2.0 + 2.0 | 256 | 520/550 | 50/0 | 640 | 3 | 1.8 |
| 9 | stearic acid | 5.0 | 249 | 550/500 | 0/0 | 347 | 0/1 | 0.075 |
| 10 | stearic acid | 4.0 | 236 | 470/430 | 0/0 | 198 | (2% haze) | 0.45 |
| 11 | stearic acid + ethylene glycol[1] | 4.0 + 1.0 | 244 | 520/460 | 0/0 | 278 | (1% haze) | 0.025 |
| 12 | stearic acid | 3.0 | 253 | 430/420 | 50/0 | 254 | 1.0 | 0.25 |
| 13 | stearic acid + ethylene glycol[1] | 3.0 + 1.0 | 250 | 460/410 | 0/0 | 278 | 0.03 | 0.08 |
| 14 | stearic acid + ethylene glycol | 3.0 + 2.0 | 246 | 470/390 | 0/0 | 232 | 0 | trace |
| 15 | stearic acid + ethylene glycol | 3.0 + 3.0 | 249 | 410/350 | 0/0 | 411 | 0 | 0 |
| 16 | behenic acid | 5.0 | 244 | 400/70 | 0/0 | 568 | 0 | 0 |
| 17 | behenic acid | 4.0 | 248 | 530/450 | 0/0 | 557 | haze | 0.2 |
| 18 | behenic acid + ethylene glycol[1] | 4.0 + 1.0 | 248 | 490/470 | 0/0 | 585 | very slight haze | 0 |
| 19 | behenic acid | 3.0 | 248 | 700/630 | 70/0 | 577 | 6 | 0.9 |
| 20 | behenic acid + ethylene glycol[1] | 3.0 + | 249 | 500/440 | 0/0 | 628 | trace | 0.025 |
| 21 | behenic acid + ethylene glycol[1] | 3.0 + | 247 | 640/580 | 0/0 | 752 | trace | 0 |

[1]addition of ethylene glycol to additive concentrate

Example 22: Preparation overbased calcium sulphurized phenate in the presence of stearic acid The procedure of Example 14 was repeated replacing ethylene glycol by 2 wt % of glycerol. The resulting product when treated with 400 ppm silicone had a foam tendency of 70/0.

Example 23: Treatment of overbased sulphurized magnesium phenates

A further series of tests was carried out on a conventional additive concentrate comprising an oil solution of an overbased magnesium sulphurized phenate containing 5.4 wt. % magnesium and 3.8 wt. % sulphur with a TBN of 245.

This was prepared as follows:

320 g of a 90% oil solution of sulphurized nonyl phenol having a minimum hydroxy number of 207 and containing 9 wt. % sulphur was mixed with 270 g of oil 583 g of magnesium ethoxide was added under a nitrogen blanket. A mixture of 64 g of ethoxyethanol and 64 g of water were added over 1 hour at 80° C. The mixture was then carbonated at 80° C. to 102° C. over 2 hours then during further carbonation held at 102° C. and finally heated to 150° C. for a total carbonation time of 8.5 hours during which 40–45 g of carbon dioxide were added. 106 g of oil were added and the mixture was stripped to yield the product. This additive concentrate was tested for foam tendency alone and with silicone anti-foaming additives. It was also converted to an additive concentrate of the invention by the addition of 5 wt. % (based on the weight of the additive concentrate) of behenic acid.

TABLE 3

| Example | Treatment | | Foam Tendency | |
|---|---|---|---|---|
| | Acid | wt. % | | with 400 ppm silicone |
| Comparion | None | — | 540/490 | 560/520 |
| 14 | behenic acid | 5 | 40/0 | 0/0 |

The untreated additive gave poor foam performance which was not improved by addition of a silicone anti-foam additive. By contrast addition of behenic acid to the additive concentrate resulted in a product with excellent foam performance even without addition of silicone.

Examples 24–26: Preparation of overbased sulphurized magnesium phenate in the presence of acid 29.4 kg of a 72% oil solution of sulphurized nonyl phenol having a minimum hydroxy number of 130 and containing 7 wt % sulphur was mixed with 6.3 kg of oil and 2.3 kg of crude behenic acid (55% behenic, 35% $C_{20}$, 7% stearic and 3% other acids) were mixed. 37.7 kg of magnesium ethoxide was added under a nitrogen blanket. A mixture of 3.8 kg of cellosolve and 3.8 kg of water were added over 1 hour at 80° C. The mixture was then carbonated at 80° C. to 100° C. over 2 hours then during further carbonation held at 100° C. and finally heated to 150° C. for a total carbonation time of 8.5 hours during which 7.1 kg of carbon dioxide are added 3.4 kg of oil were added and the mixture was stripped to yield a product of 235 TBN at 5.4 wt % Mg with 4.0% acid.

A generally similar procedure was carried out to prepare additive concentrates containing stearic acid (prepared from commercial acid containing 94.9 wt % stearic, 1.4 wt % $C_{16}$, 2.3 wt % $C_{19}$, 0.3 wt % $C_{19}$, 0.9 wt % $C_{20}$).

The foaming tendency of these products was measured as a 2% solution in the oil used for foam testing in Examples 1 to 7 and as a 2% solution in a high foaming base oil. The results given in Table 4 below show excellent foam performance even in a high foaming oil when compared to the comparison in Example 23.

TABLE 4

| Example | Treatment | (wt %) | Foam tendency (ml/ml) (no silicone addition) | high foaming oil | Viscosity |
|---|---|---|---|---|---|
| 24 | crude behenic acid | 4.0 | 0/0 | 0/0 | 262 |
| 25 | stearic acid | 3.0 | 0/0 | 350/250 | 226 |
| 26 | stearic acid | 5.0 | 0/0 | 40/0 | 194 |

We claim:

1. An additive concentrate for incorporation in lubricating oil composition consisting essentially of lubricating oil; and from 10 to 90 wt. % of overbased alkaline earth metal hydrocarbyl sulphurized phenate which has been treated, either during or subsequent to overbasing, with from 0.1 to 10 weight %, based on the weight of the additive concentrate, of stearic acid or anhydride or salt thereof, and which has a total base number of 235–[300] *about 260*.

2. An additive concentrate as claimed in claim 1, which contains from 30 to 90 wt. % of the overbased phenate.

3. An additive concentrate as claimed in claim 1, in which the overbased phenate is an overbased alkaline earth metal sulphurized alkyl phenate comprising $C_9$ to $C_{18}$ alkyl groups.

4. An additive concentrate as claimed in claim 1, in which the overbased phenate is an overbased calcium phenate or an overbased magnesium phenate.

5. An additive concentrate as claimed in claim 1, in which from 2 to 6 weight % of the acid or anhydride or salt thereof, is employed.

6. An additive concentrate for incorporation in a lubricating oil composition consisting essentially of lubricating oil; from 10 to 90 wt. % of overbased alkaline earth metal hydrocarbyl sulphurized phenate which has been treated, either during or subsequent to overbasing, with from 0.1 to 10 weight % of stearic acid or anhydride or salt thereof, and which has a total base number of 235–[300] *about 260* and at least 0.1 wt. % of material selected from the group consisting of polyhydric alcohol having from 2 to 4 carbon atoms, di- or tri- ($C_2$–$C_4$) glycol and ether alcohol having from 2 to 10 carbon atoms.

7. A process for preparing an improved additive concentrate consisting essentially of adding to lubricating oil from 10 to 90 wt. %, based on the weight of the total additive concentrate, of overbased alkaline earth metal hydrocarbyl sulphurized phenate having a total base number of 235–[300] *about 260*, and from 0.1 to 10 weight %, based on the weight of the total additive concentrate, of stearic acid or anhydride or salt thereof, wherein said concentrate is improved in at least one of reduced tendency to sedimentation, reduced foaming and reduced viscosity.

8. A process as claimed in claim 7, in which the acid or anhydride or salt thereof is introduced at a temperature of from 20° C. to 210° C.

9. A process as claimed in claim 8, in which the temperature is from 80° C. to 140° C.

10. A process for preparing improved additive concentrate consisting essentially of adding to lubricating oil from 10 to 90 wt. % of overbased alkaline earth metal hydrocarbyl sulphurized phenate having a total base number of 235–[300] *about 260*, from 0.1 to 10 weight % of stearic acid or anhydride or salt thereof; and at least 0.1 wt. % of material selected from the group consisting of polyhydric alcohol containing from 2 to 4 carbon atoms, di- or tri- ($C_2$–$C_4$) glycol or ether alcohol having from 2 to 10 carbon atoms, wherein said concentrate is improved in at least one of tendency to sedimentation, foaming and viscosity.

11. A lubricating oil composition comprising from 0.01 to 30 wt. %, based on the total composition weight, of additive concentrate in solution in lubricating oil, the additive concentrate consisting essentially of lubricating oil, and from 10 to 90 wt. % of an overbased alkaline earth metal hydrocarbyl sulphurized phenate which has been treated, either during or subsequent to the overbasing process, with from 0.1 to 10 wt. %, based on the weight of the additive concentrate, of stearic acid or anhydride or salt thereof, and which has a total base number of 235–[300] *about 260*.

12. A composition as claimed in claim 11, which contains from 0.5 to 20 wt. % of the additive concentrate.

13. A method for reducing the viscosity of an additive concentrate consisting essentially of lubricating oil and from 10 to 90 wt. % of overbased alkaline earth metal hydrocarbyl sulphurized phenate having a total base number of 235–[300] *about 260* consisting essentially of treating the phenate, either during or subsequent to overbasing, with from 0.1 to 10 wt. %, based on the weight of the additive concentrate, of stearic acid or anhydride or salt thereof.

14. A method according to claim 13, wherein said alkaline earth metal is selected from the group consisting of calcium and magnesium; and wherein said hydrocarbyl is $C_8$ to $C_{18}$ alkyl group.

*15. An additive concentrate for incorporation in lubricating oil composition consisting essentially of lubricating oil; and from 10 to 90 wt. % of overbased alkaline earth metal hydrocarbyl sulphurized phenate which has been treated, either during or subsequent to overbasing, with from 0.1 to 10 weight %, based on the weight of the additive concentrate, of stearic acid or anhydride or salt thereof, and having a total base number of at least 235.*

*16. An additive concentrate as claimed in claim 15, which contains from 30 to 90 wt. % of the overbased phenate.*

*17. An additive concentrate as claimed in claim 15, in which the overbased phenate is an overbased alkaline earth metal sulphurized alkyl phenate comprising $C_9$ to $C_{18}$ alkyl groups.*

*18. An additive concentrate as claimed in claim 15, in which the overbased phenate is an overbased calcium phenate or an overbased magnesium phenate.*

*19. An additive concentrate as claimed in claim 15, in which from 2 to 6 weight % of the acid or anhydride or salt thereof, is employed.*

*20. An additive concentrate for incorporation in a lubricating oil composition consisting essentially of lubricating oil; from 10 to 90 wt. % of overbased alkaline earth metal hydrocarbyl sulphurized phenate which has been treated, either during or subsequent to overbasing, with from 0.1 to 10 weight % of stearic acid or anhydride or salt thereof, and having a total base number of at least 235; and at least 0.1*

*wt. % of material selected from the group consisting of polyhydric alcohol having from 2 to 4 carbon atoms, di- or tri-($C_2$–$C_4$) glycol and ether alcohol having from 2 to 10 carbon atoms.*

*21. A process for preparing an improved additive concentrate consisting essentially of adding to lubricating oil from 10 to 90 wt. %, based on the weight of the total additive concentrate, of overbased alkaline earth metal hydrocarbyl sulphurized phenate having a total base number of at least 235, and from 0.1 to 10 weight %, based on the weight of the total additive concentrate, of stearic acid or anhydride or salt thereof, wherein said concentrate is improved in at least one of reduced tendency to sedimentation, reduced foaming and reduced viscosity.*

*22. A process as claimed in claim 21, in which the acid or anhydride or salt thereof is introduced at a temperature of from 20° C. to 210° C.*

*23. A process as claimed in claim 22, in which the temperature is from 80° C. to 140° C.*

*24. A process for preparing improved additive concentrate consisting essentially of adding to lubricating oil from 10 to 90 wt. % of overbased alkaline earth metal hydrocarbyl sulphurized phenate having a total base number of at least 235; from 0.1 to 10 weight % of stearic acid or anhydride or salt thereof; and at least 0.1 wt. % of material selected from the group consisting of polyhydric alcohol containing from 2 to 4 carbon atoms, di- or tri- ($C_2$–$C_4$) glycol or ether alcohol having from 2 to 10 carbon atoms, wherein said concentrate is improved in at least one of tendency to sedimentation, foaming and viscosity.*

*25. A lubricating oil composition comprising from 0.01 to 30 wt. %, based on the total composition weight, of additive concentrate in solution in lubricating oil, the additive concentrate consisting essentially of lubricating oil, and from 10 to 90 wt. % of an overbased alkaline earth metal hydrocarbyl sulphurized phenate which has been treated, either during or subsequent to the overbasing process, with from 0.1 to 10 wt. %, based on the weight of the additive concentrate, of stearic acid or anhydride or salt thereof, and having a total base number of at least 235.*

*26. A composition as claimed in claim 25, which contains from 0.5 to 20 wt. % of the additive concentrate.*

*27. A method for reducing the viscosity of an additive concentrate consisting essentially of lubricating oil and from 10 to 90 wt. % of overbased alkaline earth metal hydrocarbyl sulphurized phenate having a total base number of at least 235 consisting essentially of treating the phenate, either during or subsequent to overbasing, with from 0.1 to 10 wt. %, based on the weight of the additive concentrate, of stearic acid or anhydride or salt thereof.*

*28. A method according to claim 27, wherein said alkaline earth metal is selected form the group consisting of calcium and magnesium; and wherein said hydrocarbyl is $C_2$ to $C_{18}$ alkyl group.*

* * * * *

UNITED STATES PATENT AND TRADEMARK OFFICE

CERTIFICATE OF CORRECTION

PATENT NO. : Re. 35,461

DATED : February 25, 1997

INVENTOR(S) : JOHN F. MARSH, ET AL.

It is certified that error appears in the above-identified patent and that said Letters Patent is hereby corrected as shown below:

AT [57] ABSTRACT

Line 3, "treated" should read --treating--.

COLUMN 1

Line 8, "Continuation" should read --continuation--;
Line 26, "U.S. Pat. No. 3714042" should read --U.S. Pat. No. 3,714,042--;
Line 34, "3793201" should read --3,793,201--;
Line 50, "U.S. Pat. No. 3410801" should read --U.S. Pat. No. 3,410,801--;
Line 54, "U.S. Pat. No. 3242079" should read --U.S. Pat. No. 3,242,079--;
Line 58, "U.S. Pat. No. 4328111" should read --U.S. Pat. No. 4,328,111--;
Line 60, "over-based" should read --overbased--; and
Line 67, "20:1" should read --20:1,--.

COLUMN 2

Line 8, "U.S. Pat. No. 3671430" should read --U.S. Pat. No. 3,671,430--;
Line 13, "U.S. Pat. No. 4164472" should read --U.S. Pat. No. 4,164,472--; and
Line 17, "C1 to C18" should read --$C_1$ to $C_{18}$--.

COLUMN 4

Line 57, "derivatives e.g." should read --derivatives, e.g.--.

COLUMN 6

Line 55, "show" should read --shows--.

UNITED STATES PATENT AND TRADEMARK OFFICE

CERTIFICATE OF CORRECTION

PATENT NO. : Re. 35,461

DATED : February 25, 1997

INVENTOR(S) : JOHN F. MARSH, ET AL.

It is certified that error appears in the above-identified patent and that said Letters Patent is hereby corrected as shown below:

COLUMN 7, line 20,

Table 1, "not marked" should read --not measured--
line 23, and "$C_{24}$-20%" should read --$C_{24}$, 20%--.

COLUMN 9

Line 59, "oil 583 g" should read --oil. 583 g--.

COLUMN 10

Table 3, "Comparion" should read --Comparison--; and
Line 67, "added" should read --added.--.

COLUMN 11

Line 53, "*260* and" should read --*260*; and--.

COLUMN 14

Line 25, "$C_2$ to $C_{18}$" should read --$C_8$ to $C_{18}$--.

Signed and Sealed this

Ninth Day of December, 1997

*Attest:*

*Attesting Officer*

BRUCE LEHMAN

*Commissioner of Patents and Trademarks*